(12) United States Patent
Oikawa

(10) Patent No.: US 6,397,060 B1
(45) Date of Patent: May 28, 2002

(54) RADIO COMMUNICATION APPARATUS CAPABLE OF UPDATING MENU DATA LISTING INFORMATION SERVICES

(75) Inventor: Kazuyuki Oikawa, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/318,746

(22) Filed: May 26, 1999

(30) Foreign Application Priority Data

May 27, 1998 (JP) ............................................ 10-145311

(51) Int. Cl.[7] .......................... H04M 3/00; H04M 1/00; H04B 1/38
(52) U.S. Cl. ........................................ 455/420; 455/564
(58) Field of Search ................................ 455/418, 419, 455/420, 466, 564, 566, 550

(56) References Cited

U.S. PATENT DOCUMENTS 5,794,142 A * 8/1998 Vanttila et al. ............. 455/466
6,014,569 A * 1/2000 Bottum ....................... 455/466
6,167,255 A * 12/2000 Kennedy, III et al. ....... 455/414

\* cited by examiner

*Primary Examiner*—Nguyen T. Vo
(74) *Attorney, Agent, or Firm*—Sughrue Mion, PLLC

(57) ABSTRACT

A mobile terminal 4 sends updating history data to a communication apparatus 1 when the user of the terminal 4 turns on the power supply, when the user reads an information dial service menu, or when a preselected period of time elapses. With the updating history data, the terminal 4 inquires the communication apparatus 1 whether or not the information dial service menu stored in the terminal 4 has been altered. In response, the communication apparatus 1 compares a date of updating included in the received updating history data and the date of updating of an information dial service menu stored therein. If the received date of updating is earlier than the stored date of updating, the communication apparatus 1 sends data including the latest information dial service to the terminal 4. The terminal 4 replaces the menu stored therein with the latest menu received from the communication apparatus 1.

8 Claims, 12 Drawing Sheets

FIG.3

| DATE OF UPDATING | 1999/04/01 10:00 | |
|---|---|---|
| NUMBER | SERVICE NAME | BRIEF DESCRIPTION OF SERVICE |
| #1234 | WEATHER | WEATHER FORECAST FOR TODAY AND TOMORROW |
| #5678 | TRAFFIC | TRAFFIC REPORT ON ROADS |
| #1122 | BASEBALL | RESULTS OF TODAY'S PROFESSIONAL BASEBALL GAMES |
| | | |

RADIO COMMUNICATION APPARATUS CAPABLE OF UPDATING MENU DATA LISTING INFORMATION SERVICES

BACKGROUND OF THE INVENTION

1. Field of the Invention

The present invention relates to a radio communication apparatus and more particularly to a radio communication apparatus capable of receiving information services including weather forecast and traffic information.

2. Description of the Related Art

Today, a radio communication apparatus capable of receiving information dial services is extensively used. When the user of this kind of communication apparatus dials a desired telephone number by pressing a call button, the apparatus displays weather forecast, traffic information or similar information or outputs it via a speaker.

Generally, telephone numbers assigned to information dial services are stored in the above communication apparatus beforehand together with the names of the information dial services. Alternatively, the user may register telephone numbers assigned to preselected information dial services by operating keys arranged on the communication apparatus. The communication apparatus displays an information dial service menu stored therein and listing the names and telephone numbers of information dial services on its display. This allows the user to see a telephone number assigned to a desired information dial service.

Telephone numbers assigned to information dial services each are smaller in the number of figures than ordinary telephone numbers, i.e., each have about five figures consisting of a symbol and numerals. Such information dial services are easy to receive and rapidly spreading. Further, the kinds of information dial services available with the communication apparatus are increasing, and the services are frequently updated.

The problem with the conventional communication apparatus of the type described is that every time the information dial service menu is updated, the user must alter the menu stored in the apparatus by operating keys. Should the user forget to alter the menu, the user would call a disused information dial service or an information dial service different from desired one.

SUMMARY OF THE INVENTION

It is therefore an object of the present invention to provide an improved radio communication apparatus.

It is another object of the present invention to provide a radio communication apparatus capable of automatically updating an information dial service menu stored therein without resorting to the user's operation.

In accordance with the present invention, a radio communication apparatus includes a receiving section for receiving a radio signal. A RAM stores an information dial service menu. A transmitting section transmits a request signal for inquiring whether or not the information dial service menu should be updated. A decision section determines whether or not to update the information dial service menu on the basis of a signal received by the receiving section as an answer to the request signal. An updating section automatically updates the information dial service menu on the basis of the result of decision made by the decision section.

Also, in accordance with the present invention, a radio communication system includes a base station apparatus and a radio communication apparatus. The radio communication apparatus includes a RAM for storing an information dial service menu, a sending section for sending updating history data to the base station apparatus at any suitable timing, a deciding section for determining whether or not the apparatus has received a signal answering the updating history data within a preselected period of time, and an updating section for updating the information dial service menu on the basis of the result of decision of the deciding section. The base station apparatus includes a receiving section for receiving the updating history data sent from the radio communication apparatus, a comparing means for comparing the updating history data and updating history data stored in the base station apparatus, a sending section for sending the signal to the radio communication apparatus.

Further, in accordance with the present invention, a method of controlling the updating of an information dial service menu stored in a rad:Lo communication apparatus includes the steps of storing the information dial service menu, determining whether or not to update the information dial service menu, and automatically updating the information dial service menu on the basis of the result of the above decision.

BRIEF DESCRIPTION OF THE DRAWINGS

These and other objects, features and advantages of the invention will become more fully apparent from the following detailed description taken in conjunction with the accompanying drawings in which:

FIG. 3 shows a specific table representative of an information dial service menu stored in a RAM (Random Access Memory) shown in FIG. 2;

DETAILED DESCRIPTION OF THE PREFERRED EMBODIMENTS

Figure 1:
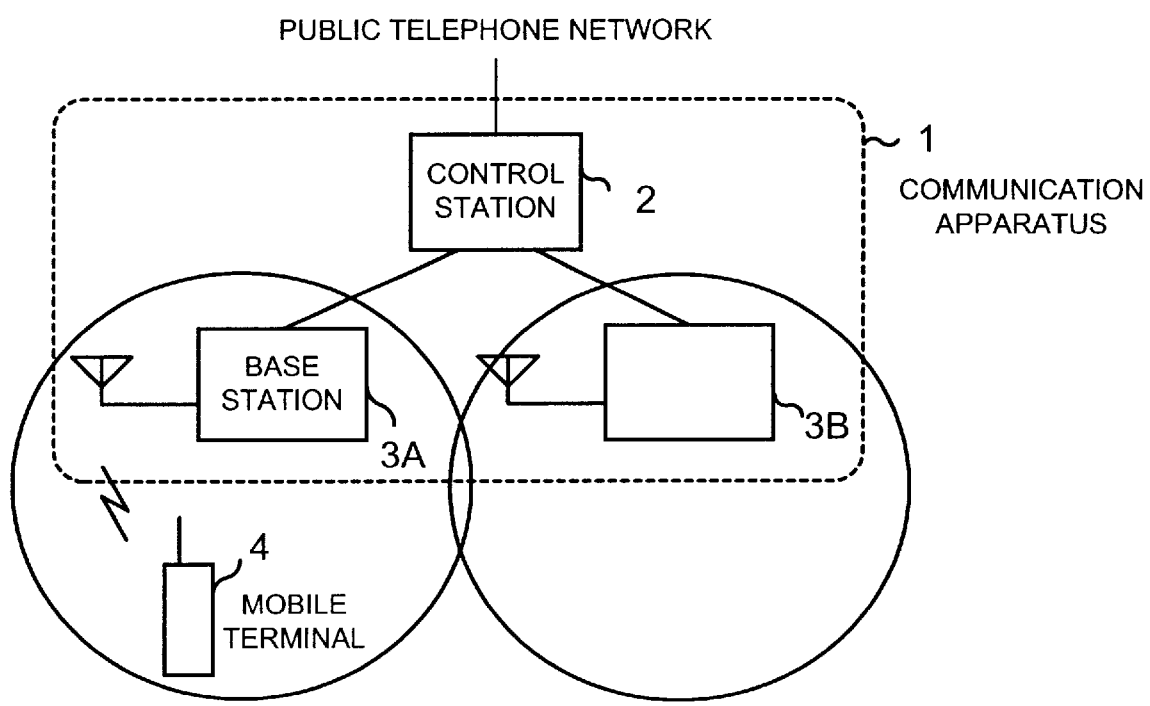
FIG. 1 is a block diagram schematically showing a specific relation between a mobile terminal and a communication apparatus in accordance with the present invention.

Referring to FIG. 1 of the drawings, a specific radio communication system to which the present invention is applied is shown. As shown, the system includes two base stations 3A and 3B representative of a plurality of base stations and each forming a respective service area. A control station 2 is connected to the base stations 3A and 3B in order to control communication between a public telephone network and mobile terminals represented by a single mobile terminal 4. The control station 2 stores the latest information dial service menu and updates the menu every time it is altered. The base stations 3A and 3B each communicate with the mobile terminal 4 existing in its service area. In FIG. 1, the mobile terminal 4 is shown as existing in the service area of the base station 3A

Let the control station 2 and base stations 3A and 3B be collectively referred to as a communication apparatus 1.

When the mobile terminal 4 is transferred from one service area to another service area, it receives a control signal being sent from the base station forming the new service area at preselected intervals and registers its location at the base station. Assume that the power supply of the mobile terminal 4 is turned on or that the terminal 4 positioned outside of the communicable range covered by, e.g., the base station 3A is brought into the communicable range. Then, the mobile station 4 also receives the above control signal from the base station 3A. The mobile terminal 4 determines, based on the received control signal, whether or not the service area where it exists is identical with the service area where it registered a location last time, and registers its location only if the former is different from the latter.

Figure 2:
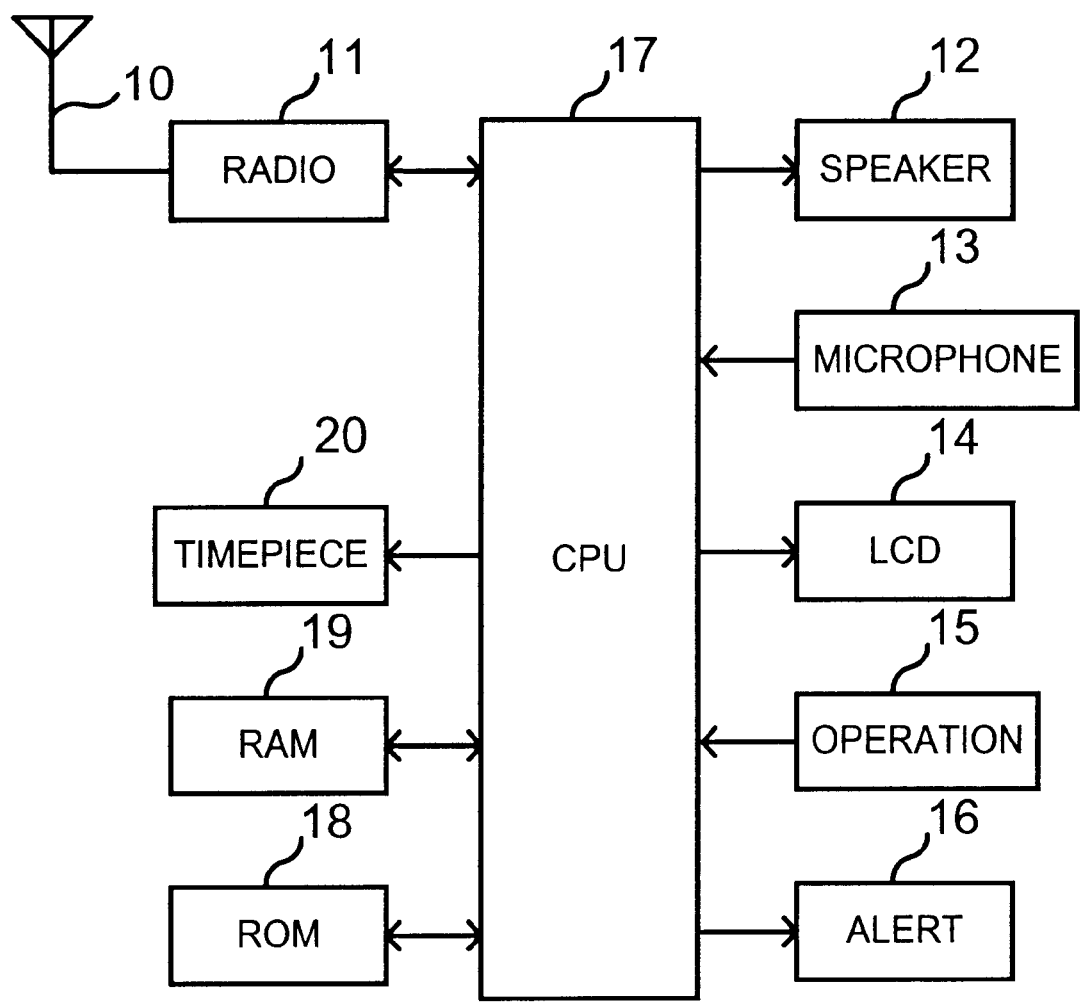
FIG. 2 is a schematic block diagram showing a specific configuration of the mobile terminal shown in FIG. 1.

FIG. 2 shows a specific configuration of the mobile terminal 4 implemented as a handy phone by way of example. As shown, the handy phone includes a radio 11 for receiving a radio signal from the communication apparatus 1 via an antenna 10 or sending a radio signal to the apparatus 1 via the antenna 10. A speaker 12 outputs a speech received from a remote station and may additionally output a ringing tone. The user's speech is input via a microphone 13. An LCD (Liquid Crystal Display) 14 is capable of displaying various kinds of information including time, destination's phone number and information showing whether or not the handy phone lies in a communicable range. The LCD 14 may be replaced with a CRT (Cathode Ray Tube), if desired. An operation 15 is operated by the user for inputting particular data for each function, for reading the information dial service menu, for turning on or turning off the power supply, and for originating or answering a call. An alert 16 alerts the user to a call incoming and may advantageously be implemented by at least one of a speaker, an LED (Light Emitting Diode), and a vibrator. The speaker 12 may serve as the speaker of the alert 16 at the same time.

A CPU (Central Processing Unit) 17 executes various kinds of processing in accordance with a program stored in a ROM (Read Only Memory) 18. Specifically, the CPU 17 controls the transmission and receipt of radio signals effected by the radio 11, determines whether or not the handy phone is in a communicable range, controls the display of information on the LCD 14, detects the manipulation of the operation 15, and writes and reads the information dial service menu out of a RAM 19. The RAM 19 stores the information dial service menu together with the date on which the menu is updated. A timepiece 20 counts time.

FIG. 3 is a table representative of a specific information dial service menu stored in the RAM 19. As shown, the menu lists destinations' phone numbers, the names of information dial services respectively corresponding to the phone numbers, and the brief descriptions of the contents of the services. Such information appear on the LCD 14 when the user operates the operation 15 for reading the menu. When the user inputs, e.g., a phone number "#1234" on the operation 15, information relating to the weather forecast for today and tomorrow is received via the antenna 10. The received information is displayed on the LCD 14 or output via the speaker 12 in the form of a speech, so that the user can see the weather forecast in a moment. The RAM 19 stores the date on which the menu was updated, together with the above various information.

Figure 4:
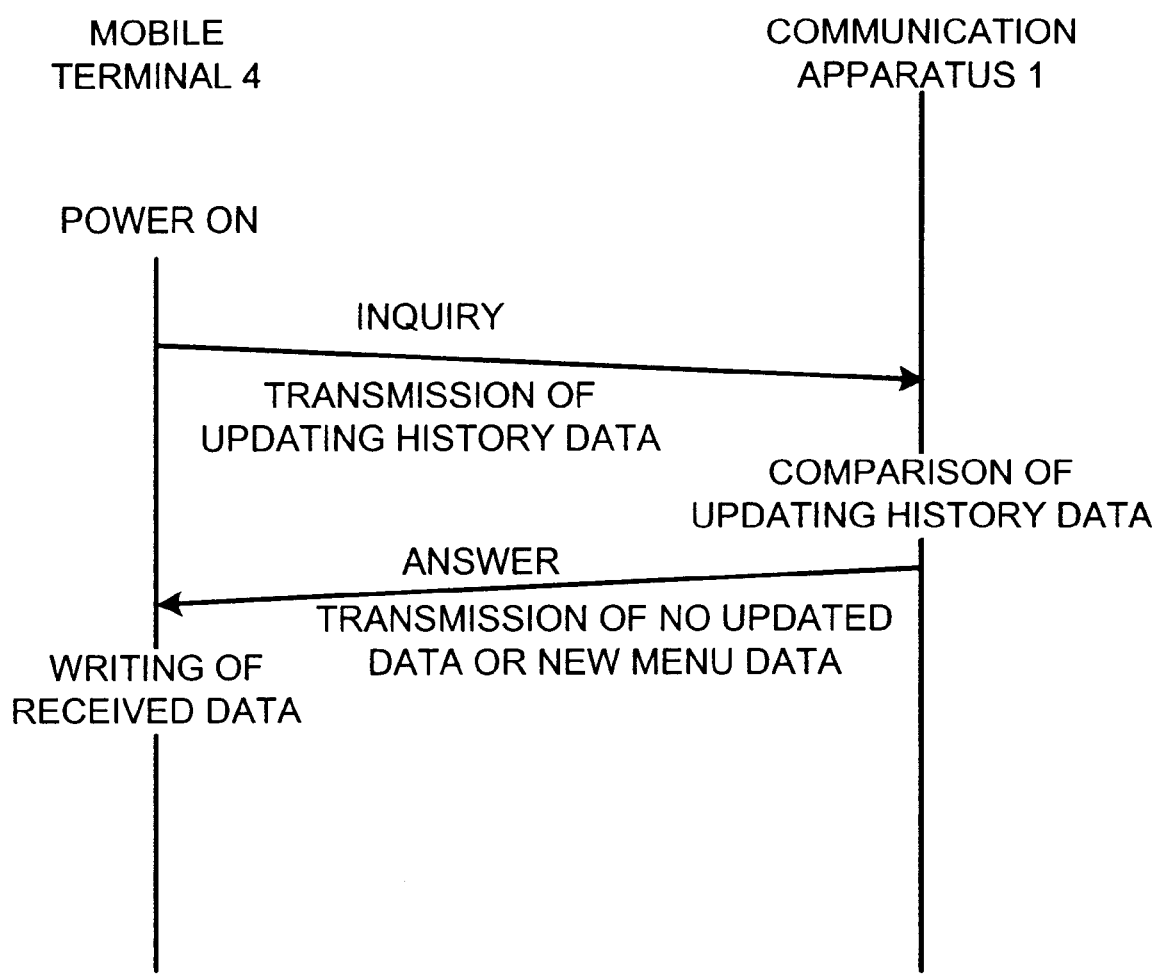
FIG. 4 shows a specific communication sequence between the mobile terminal and the communication apparatus and representative of a first embodiment of the present invention.

Reference will be made to FIG. 4 for describing a specific communication sequence between the mobile terminal 4 and the communication apparatus 1 and representative of a first embodiment of the present invention. As shown, when the user turns on the power supply of the mobile terminal 4, the terminal 4 sends updating history data, i.e., the date of updating stored in the RAM 19 to the communication apparatus 1, i.e., control station 2 via the bases station 3A. By sending the updating history data, the mobile terminal 4 inquires the control station 2 whether or not the information dial service menu stored in the RAM 19 is up-to-date. The communication apparatus 1 compares the date of updating included in the updating history data with the date of updating of an information dial service menu stored in the apparatus 1. If the date of updating included in the received information is earlier than the date of updating stored in the communication apparatus 1, then the apparatus 1 sends data including the latest information dial service menu to the mobile terminal 4. The latest menu is sent in the form of character data including the various information shown in FIG. 3.

On receiving the data including the latest information dial service menu from the communication apparatus 1, the mobile terminal 4 separates the menu from the data and writes it in the RAM 19 while discarding the old menu, thereby updating the menu. In addition, the current time is read out of the timepiece 20 and written to the RAM 19 together with the new menu.

Figure 5:
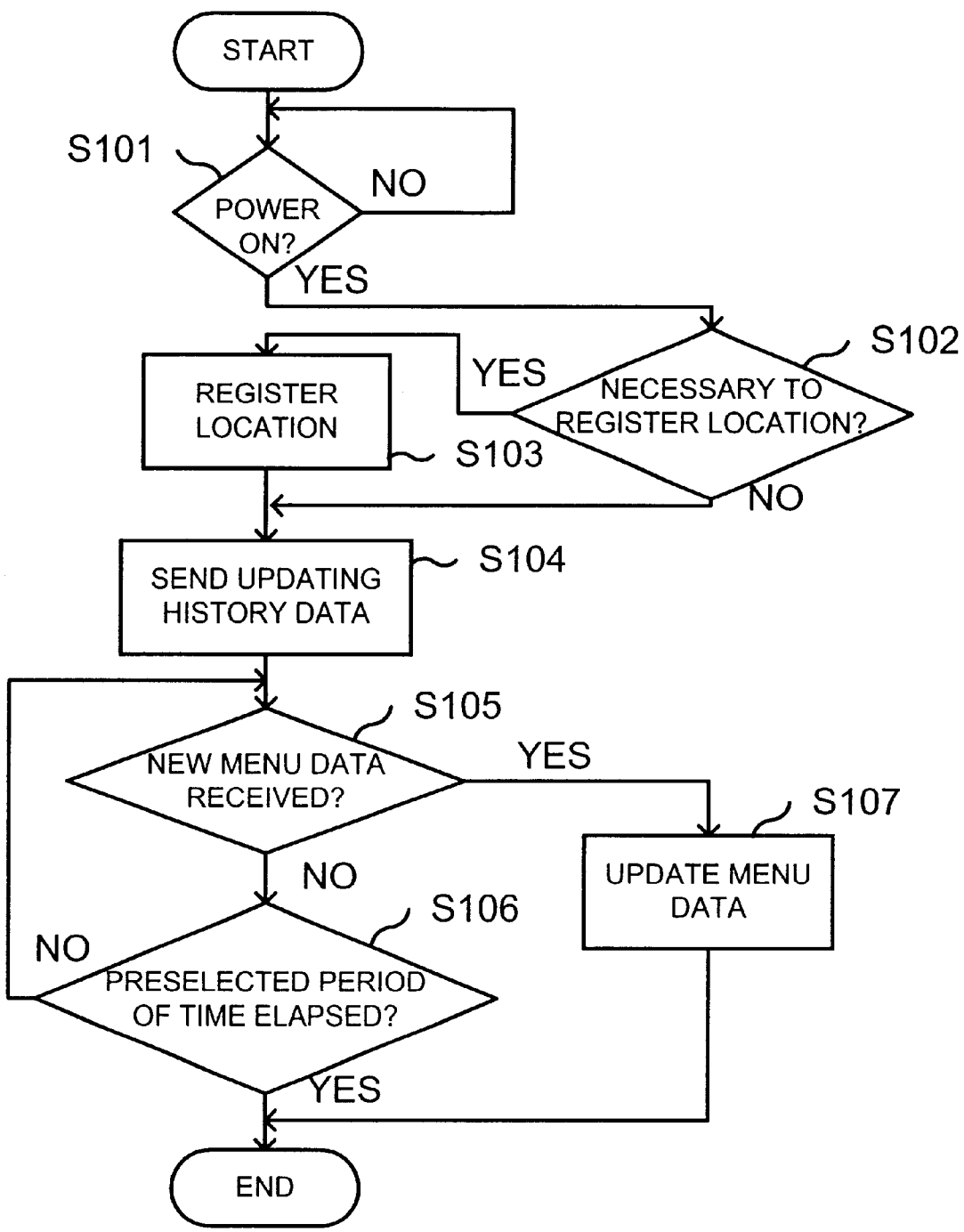
FIG. 5 is a flowchart demonstrating a specific operation of the mobile terminal shown in FIG. 4.

FIG. 5 demonstrates a specific operation of the mobile terminal 4 shown in FIG. 4. As shown, when the power supply of the terminal 4 is turned on (YES, step S101), the terminal 4 receives a control signal being sent from the base station 3A covering the terminal 4 at preselected intervals. The terminal 4 determines, based on the control signal, whether or not the service area in which it exists is identical with the service area where it registered a location last time (step S102). If the current service area is different from the last service area, i.e., if the terminal 4 must newly register a location (YES, step S102), the terminal 4 registers its location at the base station 3A covering the terminal 4 (step S103). If the current service area is identical with the last service area (NO, step S102), the terminal 4 does not register a location.

After the step S103 or if the answer of the step S102 is NO, the terminal 4 sends its updating history data to the communication apparatus 1 (step S104). Then, the terminal 4 determines whether or not data including a new information dial service menu has been received from the communication apparatus 1 (step S105). If the answer of the step S105 is NO, the terminal 4 determines whether or not a preselected period of time, e.g., 15 seconds have elapsed (step S106). On the elapse of the preselected period of time (YES, step S106), the terminal 4 ends the procedure, determining that a new information dial service menu does not exist. So long as the answer of the step S106 is NO, the terminal. 4 repeatedly executes the steps S105 and S106.

Assume that the terminal 4 receives data including a new dial service menu within the above preselected period of time (YES, step S105). Then, the terminal 4 updates the information dial service menu and the date of updating stored in the RAM 19 (step S107). At the time of updating, the alert 16 should preferably inform the user of the updating of the menu by, e.g., outputting an alert tone "pip", by causing an LED to blink or by causing a vibrator to vibrate. To distinguish this alert from the usual alert for informing the user of an incoming call, the former should preferably be different in alert mode, interval and so forth from the latter.

Further, a message showing the user the updating of the information dial service menu, e.g., "Updated the service menu." may be displayed on the LCD 14. Alternatively, the new information dial service menu received from the communication apparatus 1 may be displayed on the LCD 14 in place of the above message. The message or the menu appearing on the LCD 14 allows the user to recognize the updating of the menu in a moment.

If desired, an arrangement may be made such that the LCD 14 does not display anything at the time of updating of the menu and displays, e.g., the message "Updated the service menu." when, e.g., the user operates the operation 15 later. Such an arrangement makes it needless for the user to constantly care about whether or not the menu has been updated.

In the step S104 shown in FIG. 5, the terminal 4 sends the updating history data to the communication apparatus 1 after registering the location in the step S103. Alternatively, the terminal 4 may send the updating history data to the apparatus 1 during registration.

As stated above, in the first embodiment, the mobile terminal 4 inquires the communication apparatus 1 whether or not the information dial service menu has been updated, every time its power supply is turned on. If the menu has been updated, the terminal 4 replaces its menu with the latest menu received from the communication apparatus 1. Therefore, the user does not have to change the items of the menu stored in the RAM 19 every time they are altered. In addition, the user is prevented from dialing a wrong number when calling a desired information dial service.

The first embodiment causes the mobile terminal 4 to access the communication apparatus 1 for the inquiry about the updating of the information dial service menu every time its power supply is turned on. This, however, aggravates the current consumption of the terminal 4 due to the repeated transmission of the updating history data. In light of this, the terminal 1 may send the above inquiry only when the user reads the menu stored in the RAM 19 via the operation 15, as will be described hereinafter.

Figure 6:
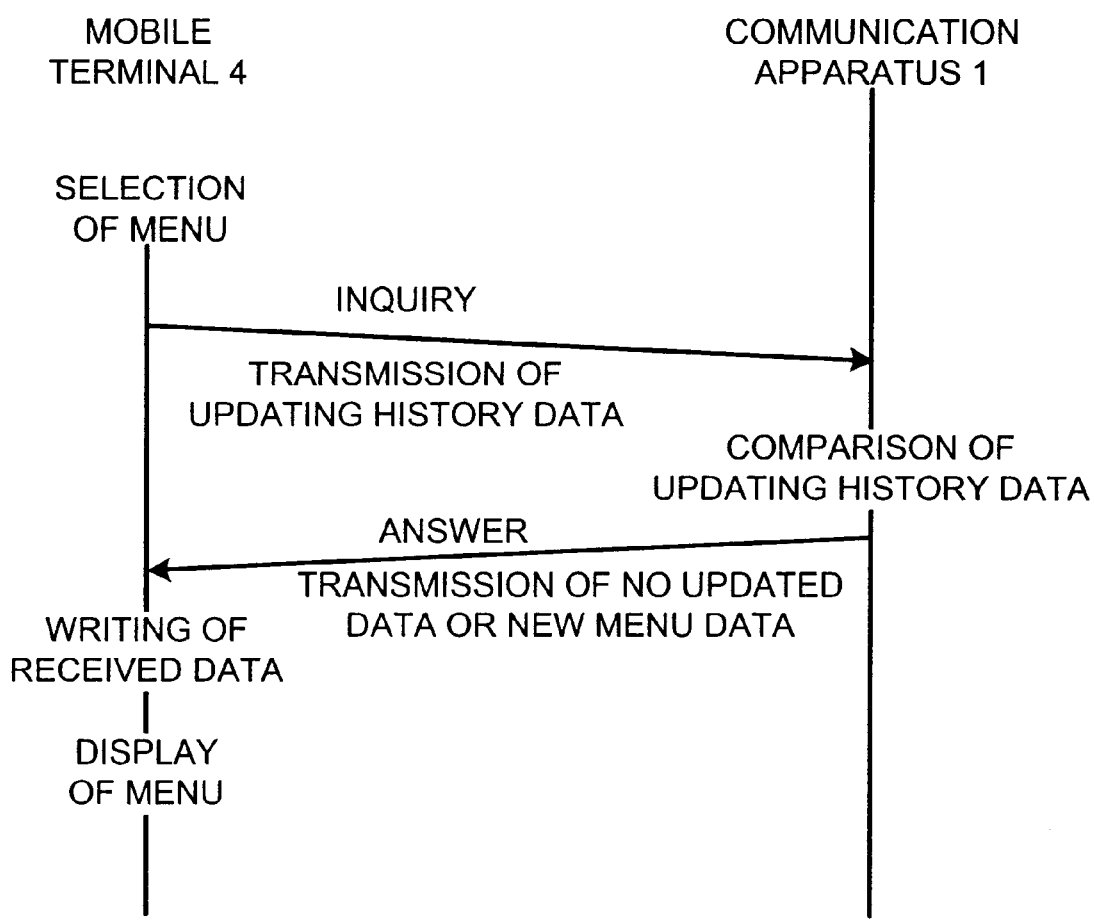
FIG. 6 shows a specific communication sequence between the mobile terminal and the communication apparatus and representative of a second embodiment of the present invention.

FIG. 6 shows a specific communication sequence between the mobile terminal 4 and the communication apparatus 1 and representative of a second embodiment of the present invention. As shown, assume that the user turns on the power supply of the mobile terminal 4 and then operates the operation 15 in order to read the information dial service menu stored in the RAM 19. Then, the mobile terminal 4 sends its updating history data, i.e., the date of updating stored in the RAM 19 to the communication apparatus 1, i.e., control station 2 via the base station 3A, thereby inquiring the apparatus 1 whether or not the information dial service menu has been altered. Subsequently, the mobile terminal 4 updates the menu stored in its RAM 19 on the basis of the latest menu received from the communication apparatus 1. This part of the procedure is identical with the procedure shown in FIG. 4 and will not be described specifically in order to avoid redundancy.

In this embodiment, when the stored in the RAM 19 is updated, the updated menu appears on the LCD 14. When the menu stored in the RAM 19 is not updated, it appears on the LCD 14 without any change. The mobile terminal 4 may be constructed to display, when updated the menu, a message informing the user of the updating, e.g., "Updated the menu." and then display the updated menu when, e.g., the user operates the operation 15 later.

Figure 7:
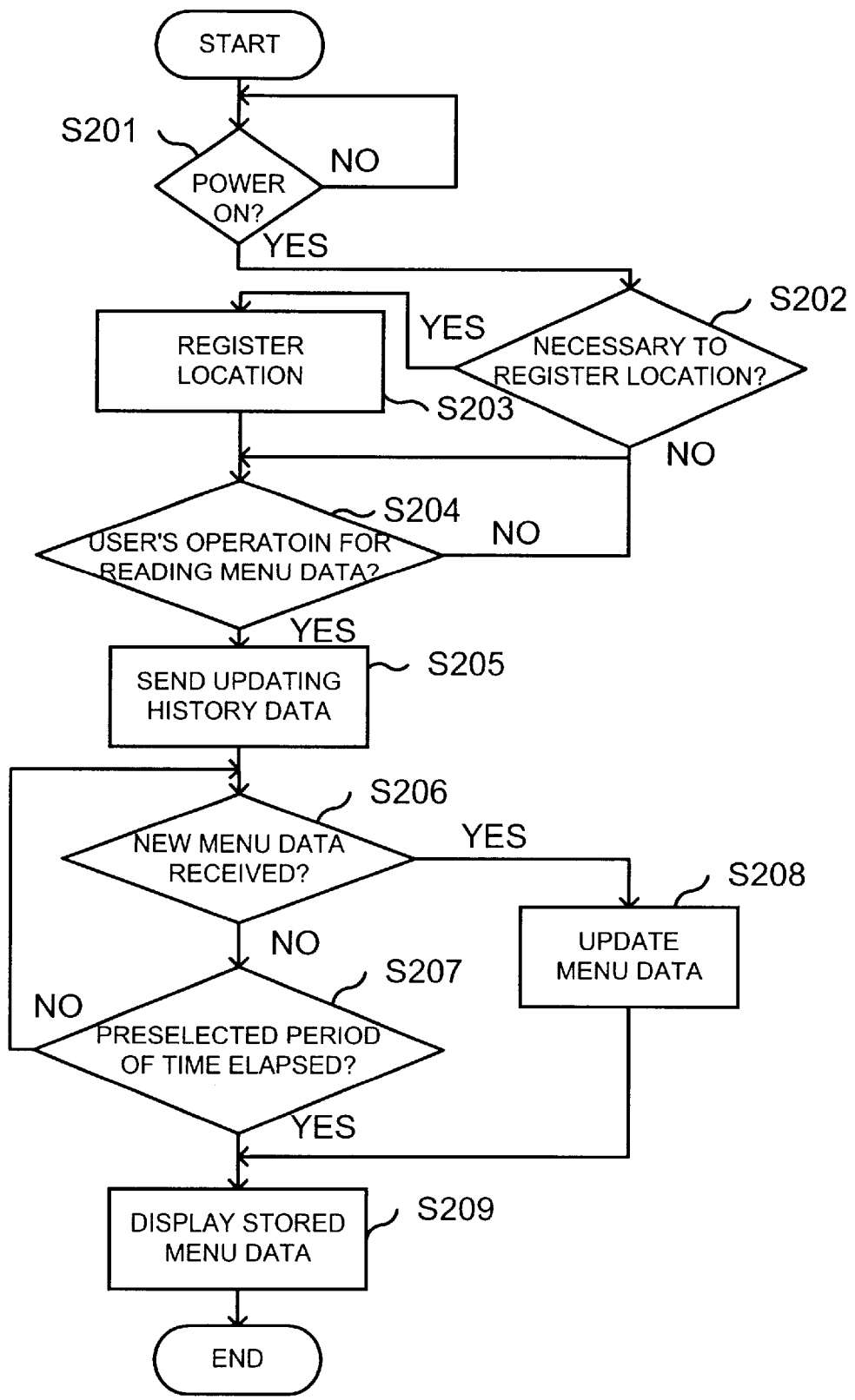
FIG. 7 is a flowchart representative of a specific operation of the mobile terminal shown in FIG. 6.

FIG. 7 demonstrates a specific operation of the mobile terminal 4 shown in FIG. 6. In FIG. 7, steps S201–S203 are identical with the steps S101–S103 of FIG. 5 and will not be described specifically in order to avoid redundancy. As shown, if a location does not have to be registered (NO, step S202) or if a location is registered in the step S203, whether or not the user has operated the operation 15 for reading out the information dial service menu is determined (step S204). If the answer of the step S204 is positive (YES), the updating history data, i.e., the date of updating stored in the RAM 19 is sent to the communication apparatus 1 (step S104).

Steps S205–S208 shown in FIG. 7 are identical with the steps S104–S107 shown in FIG. 5 and will not be described specifically in order to a-void redundancy.

When the preselected period of time elapses (YES, step S207) or after the menu stored in the RAM 19 has been updated in the step S208, the menu existing in the RAM 19, i.e., the existing menu or the updated menu is displayed on the LCD 14.

As stated above, in the illustrative embodiment, only when the user operates the operation 15 for reading the information dial service menu, the mobile terminal 4 inquires the communication apparatus 1 whether or not the menu has been updated. This successfully prevents current consumption from being aggravated due to the transmission of updating history data effected every time the power supply of the terminal 4 is turned on. Again, the user does not have to change the items of the menu stored in the RAM 19 every time they are altered. In addition, the user is prevented from dialing a wrong number when calling a desired information dial service.

Figure 8:
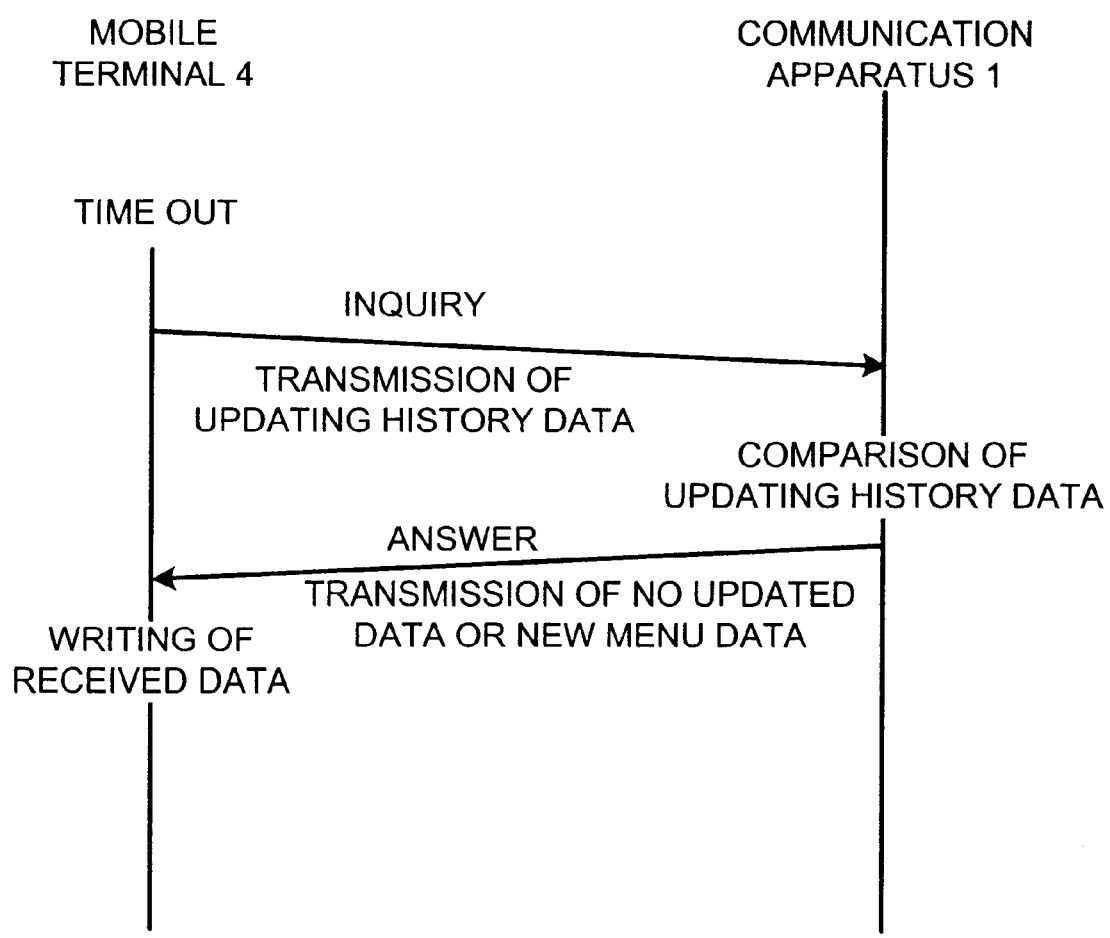
FIG. 8 shows a specific communication sequence between the mobile terminal and the communication apparatus and representative of a third embodiment of the present invention.

Referring to FIG. 8, a specific communication sequence between the mobile terminal 4 and the communication apparatus 1 and representative of a third embodiment of the present invention will be described. In this embodiment, the mobile station 4 sends the inquiry about the updating of the information dial service menu to the communication apparatus 1 at preselected intervals. Specifically, as shown in FIG. 8, when the power supply of the mobile terminal 4 is turned on, a timer, not shown, starts counting time. When the timer counts up the preselected period of time, the mobile terminal 4 sends the updating history data, i.e., the date of updating stored in the RAM 19 to the control station 2 via the base station 3A in order to inquire whether or not the information dial service menu has been updated.

The procedure for the mobile terminal 4 to replace the information dial service menu stored in the RAM 19 with the latest menu received from the communication apparatus 1 is the same as the procedure shown in FIG. 4 and will not be described specifically in order to avoid redundancy.

The timer may count the preselected period of time based on the time being counted by the timepiece 20. Specifically, when the power supply of the mobile terminal 4 is turned on, the terminal 4 may read the current time out of the timepiece 20, temporarily write it in a RAM, not shown, as a reference time, and send the updating history data to the communication apparatus 1 on the elapse of a preselected period of time since the above reference time. The prerequisite with this alternative scheme is that every time the mobile terminal 4 sends the updating history data, it replaces the reference time with the time of sending of the data.

Figure 9:
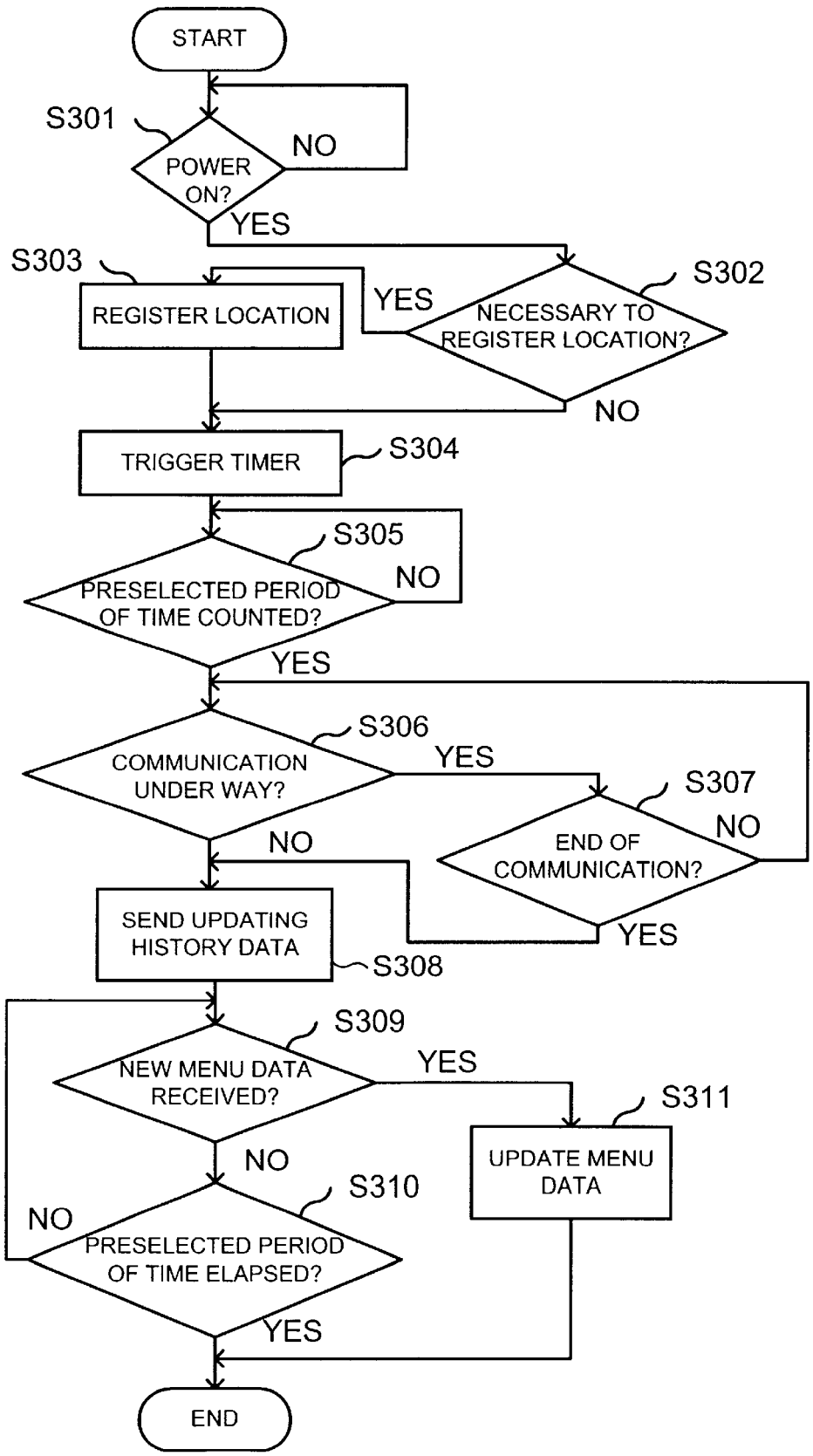
FIG. 9 is a flowchart representative of a specific operation of the mobile terminal shown in FIG. 8.

FIG. 9 demonstrates a specific operation of the mobile terminal 4 shown in FIG. 8. In FIG. 9, steps S301–S303 are identical with the steps S101–S103 shown in FIG. 5 and will not be described specifically in order to avoid redundancy. As shown, assume that a location does not have to be registered (NO, step S302) or that a location is registered (step S303). Then, the timer, not shown, starts counting time (step S304). Subsequently, whether or not the timer has counted up the preselected period of time is determined (step S305). If the answer of the step S305 is YES, whether or not communication is being held on the terminal 4 is determined (step S306). If the answer of the step S306 is YES, whether or not the communication has ended is determined (step S307). If the answer of the step S306 is negative (NO) or if the answer of the step S307 is YES, the updating history data, i.e., the date of updating stored in the RAM 19 is sent to the communication apparatus 1 (step S308). It follows that if the communication is under way when the timer reaches the preselected period of time, the updating history data is sent to the communication apparatus 1 as soon as the conversation ends.

Steps S308–S311 shown in FIG. 9 are identical with the steps S104–S107 shown in FIG. 5 and will not be described specifically in order to avoid redundancy.

As stated above, in the third embodiment, the mobile station 4 sends the inquiry about the updating of the information dial service menu to the communication apparatus 1 at preselected intervals and can therefore update the menu which may be frequently altered any time. Also, the user does not have to change the items of the menu stored in the RAM 19 every time they are altered, as in the first and second embodiments. In addition, the user is prevented from dialing a wrong number when calling a desired information dial service.

In the above first to third embodiments, when the date of updating sent from the mobile terminal 4 to the communication apparatus 1 as a part of the updating history data is later than the date of updating stored in the apparatus 1, the apparatus 1 sends the latest information dial service menu to the terminal 4. Alternatively, the apparatus 1 may send only an altered content to the terminal 1 in place of the whole updated information dial service menu, as follows.

Figure 10:
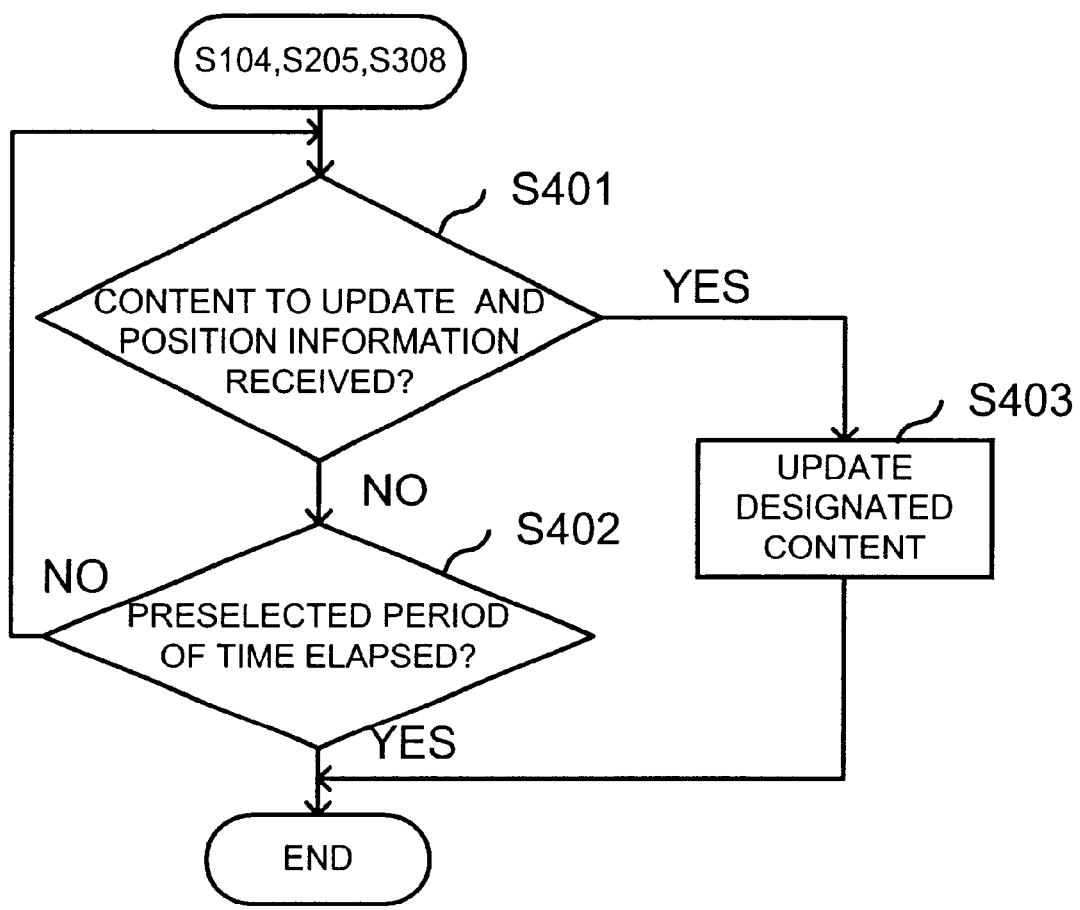
FIG. 10 is a flowchart showing a specific operation of the mobile terminal representative of a fourth embodiment of the present invention.

FIG. 10 demonstrates a specific operation of the mobile terminal representative of a fourth embodiment of the present invention. In FIG. 10, a sequence of steps up to the transmission of the updating history data to the communication apparatus 1 after the turn-on of the power supply are identical with the steps S101–S104 of FIG. 5, the steps S201–S205 of FIG. 7 and the steps S301–S308 of FIG. 9 and will not be described specifically in order to avoid redundancy. As shown, after the transmission of the updating history data to the communication apparatus 1 (step S104 of FIG. 5, step S205 of FIG. 7 or step S308 of FIG. 9), whether or not a new content to replace the existing content and position information are received is determined (step S401). Specifically, if the mobile terminal 4 receives only a new content, it cannot see which part of its information dial service menu should be updated. In light of this, the communication apparatus 1 sends to the terminal 4 not only a new content but also an item to update and a position information representative of an updated information dial service.

As shown in FIG. 10, when the terminal 4 does not receive any new or updated content and position information from the communication apparatus, it determines whether or not a preselected period of time, e.g., 15 seconds have elapsed (step S402). If the answer of the step S402 is YES, the terminal 4 ends the procedure, determining that no contents have to be altered. If the answer of the step S402 is NO, the terminal 4 repeats the steps S401 and 402 until the answer of the step S401 turns from NO to YES.

When the terminal 4 receives a new content and position information from the communication apparatus 1 within the preselected period of time (YES, step S401), it updates the item of the information dial service menu stored in the RAM 19 which is designated by the position information. In addition, the terminal 4 alters the date of updating (step S403). In the illustrative embodiment, after the item designated by the position information has been updated in step S403, the menu stored in the RAM 19 is displayed on the LCD 14.

Figure 11:
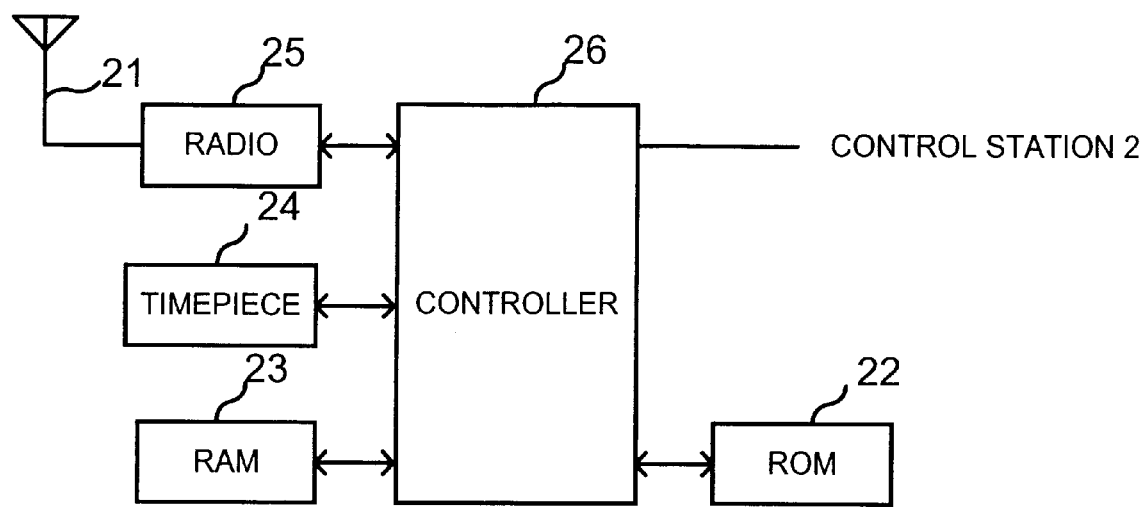
FIG. 11 is a block diagram schematically showing a specific configuration of a communication apparatus included in the fourth embodiment.

FIG. 11 shows a specific configuration of the communication apparatus 1 included in the fourth embodiment. It is to be noted that FIG. 11 shows only structural elements relevant to the illustrative embodiment. As shown, the communication apparatus 1 includes a radio 25. The radio 25 receives a radio signal from the mobile terminal 4 via an antenna 21 or sends a radio signal to the terminal 4 via the antenna 21. A controller 26 executes processing on the basis of a program stored in a ROM 22. For example, the controller 26 controls the transmission and receipt of radio signals by the radio 25 and the writing and reading of an information dial service menu out of a RAM 23.

The RAM 23 stores updating information, i.e., a content to update, an item to update and position information representative of an updated information dial service together with a date of updating. A timepiece 20 counts time. Every time the updating information and date of updating are altered, the updating information and date of updating stored in the RAM 23 are deleted. However, when mobile terminal 4 does not send any updating history data to the communication apparatus 1 over a long period of time, only a part of the information dial service menu stored in the terminal 4 is updated on the basis of the latest updating information stored in the communication apparatus 1. As a result, the terminal 4 cannot update contents altered by the communication apparatus 1 before the transmission of updating history data to the apparatus 1.

For example, assume that the number "#1234" assigned to weather forecast (see FIG. 3) is replaced with a number "#1111" at 10 o'clock of Apr. 1, 1999, and the number "#5678" assigned to traffic information (see FIG. 3) is replaced with a number "#4321" at 11 o'clock of the same date. Then, the content "#4321" to alter is stored in the RAM 23 of the communication apparatus 1 together with the associated location information and date of updating. When the communication apparatus 1 receives updating history data from the mobile terminal 4 at 12 o'clock of the above date, the former provides the latter with the latest updating information, i.e., the replacement of the traffic information number "#5678" with the number "#4321". However, the apparatus 1 does not inform the terminal 4 of the replacement of the weather forecast number "#1234" with the number "#1111". This prevents the user of the terminal 4 from receiving weather forecast information even when the user dials the number "#1234".

In light of the above, the RAM 23 should preferably store a plurality of past updating information and dates of updating, i.e., a plurality of histories. In such a case, the updating information and the dates of updating stored in the RAM 23 will be sequentially deleted, the oldest one being first, when reached a preselected number. If desired, the updating information and the dates of updating may each be deleted on the elapse of a preselected period of time, e.g., one month.

Figure 12:
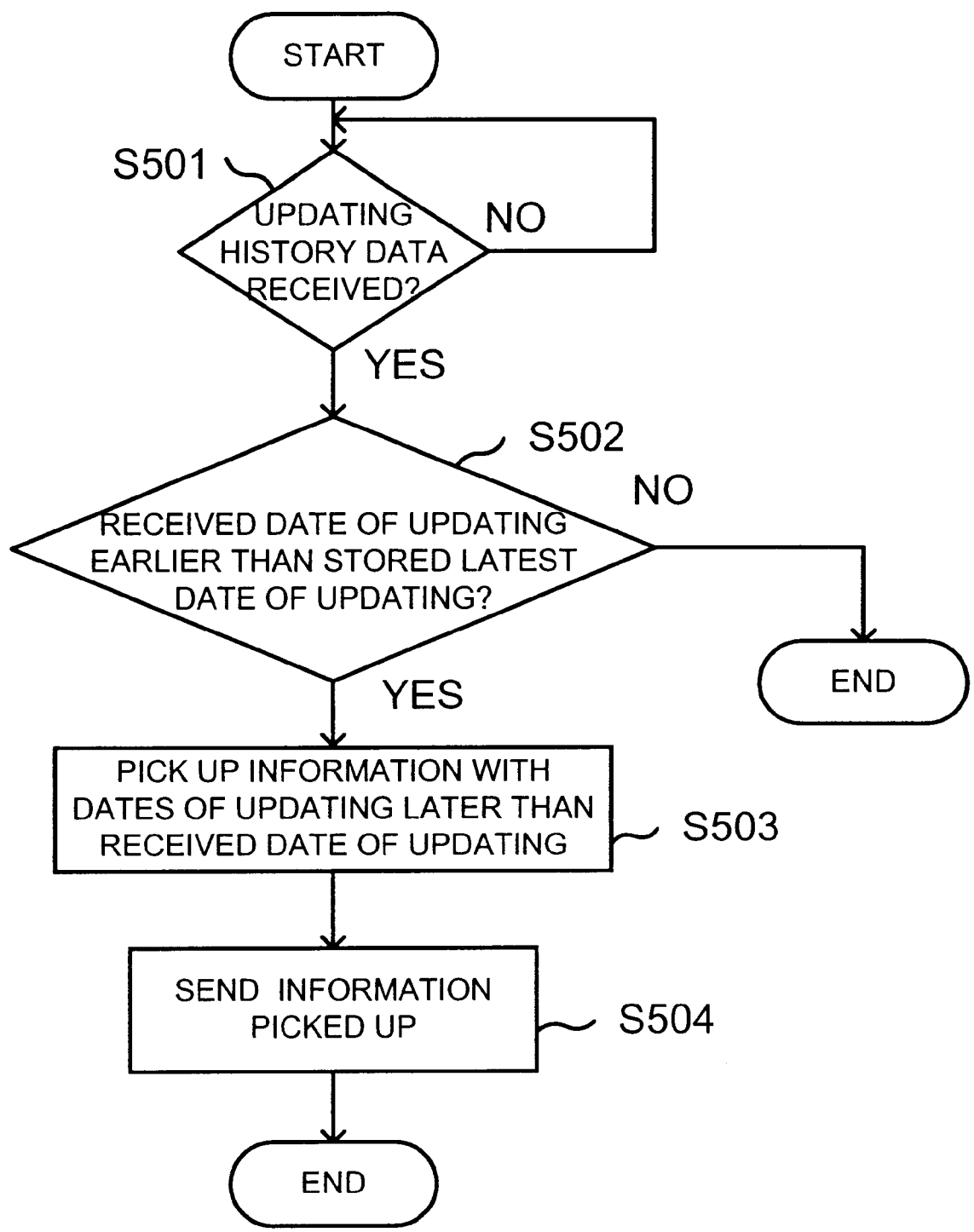
FIG. 12 is a flowchart demonstrating a specific operation of the communication apparatus included in the fourth embodiment.

FIG. 12 demonstrates a specific operation of the communication apparatus 1 included in the fourth embodiment. As shown, the apparatus 1 determines whether or not it has received updating history data from the mobile terminal 4 (step S501). If the answer of the step S501 is YES, the apparatus 1 compares a date of updating included in the received updating history information and the latest one of a plurality of dates of updating stored in the apparatus 1 (step S502). If the received date of updating is later than the latest date of updating stored in the apparatus 1 (NO, step S502), the program ends.

If the received date of updating is earlier than the latest date of updating stored in the apparatus 1 (YES, step S502), the apparatus 1 reads the date or dates of updating earlier than the received date of updating. At the same time, the apparatus 1 reads the one or more updating information stored in the RAM 23 together with the date or dates of updating (step S503). The apparatus 1 sends the updating information and the date or dates of updating to the mobile terminal 4 either collectively or on an updating information basis (step S504).

More specifically, the apparatus 1 sequentially compares the newest date of updating to the oldest date of updating stored in the RAM 23 and the date of updating included in the updating history data and thereby picks up the dates of updating later than the date of updating included in the history data. The apparatus 1 ends this processing when it finds a date of updating earlier than the date of updating included in the updating history data. On completing the processing, the apparatus 1 sends the updating information picked up to the mobile terminal 4 together with the dates of updating.

As stated above, the communication apparatus 1 does not send the whole latest information dial service menu, but sends only the altered contents of the menu. Sending the whole menu, which is massive, would require a great channel capacity.

In the above embodiment, the communication apparatus 1 sends to the mobile station 4 the contents to update, the item to update and position information showing which information dial service has been updated, together with the date of updating. If desired, the position information may be replaced with any other suitable information associated with an updated content. For example, when a number is updated, the position information may be replaced with a service name associated with the number. This allows the mobile terminal 4 received an updated content to accurately see which part of the information dial service menu stored therein should be updated.

In the embodiments shown and described, if the updating history data sent from the mobile station 4 to the communication apparatus 1 includes a date of updating later than one stored in the apparatus 1, the apparatus 1 does not send any signal to the terminal 4. Therefore, on the elapse of a preselected period of time since the transmission of the updating history data, the terminal 4 determines that the information dial service menu stored therein is not altered. However, in the second embodiment, among others, when the terminal 4 determines whether or not to update the information dial service menu in response to the user's operation of the operation 15 (FIG. 2), the terminal 4 does not display the menu until a preselected period of time elapses. In light of this, when the date of updating sent from the terminal 4 to the apparatus 1 is later than the date of updating stored in the apparatus 1, the apparatus 1 may send a signal indicating that the terminal 4 does not have to update its menu. On receiving such a signal, the terminal 4 can immediately determine whether or not to update the menu stored therein and can immediately display the menu.

In the illustrative embodiments, the communication apparatus 1 compares a date of updating included in updating history data received from the mobile terminal 4 and a date of updating stored in the apparatus 1. If desired, dates of updating to be compared may be replaced with, e.g., version information relating to the information dial service menu. Specifically, in an alternative configuration, the mobile terminal 4 sends version information relating to the menu stored therein to the communication apparatus 1 as a part of updating history data. The apparatus 1 compares the received version information and version information stored therein. If the received version information is older than the version information stored in the apparatus 1, the apparatus 1 sends the latest dial service menu stored therein to the terminal 4 together with the version information. In response, the terminal 4 writes the received latest menu in its RAM 19 (FIG. 2) and thereby updates the menu. At the same time, the terminal 1 updates the version information stored in the RAM 19 on the basis of the received version information.

In the communication apparatus 1, either one of the base station 3A and control station 2 (FIG. 1) may compare updating history data received from the mobile terminal 4, as desired.

Further, the mobile terminal 4 may compare updating history data by itself, as will be described hereinafter. The communication apparatus 1 sends updating history data, i.e., a date of updating to the terminal 4 at the time of registration or at preselected intervals. The terminal 4 compares the received updating history data with a date of updating stored therein and determines whether or not its information dial service menu should be updated. If the menu stored in the terminal 4 should be updated, the terminal 4 requests the apparatus 1 to send the latest information dial service menu. In response, the apparatus 1 sends the latest menu stored therein to the terminal 4. The terminal 4 replaces the menu stored in the RAM 19 with the latest menu received from the apparatus 1.

In the illustrative embodiments, the mobile terminal 4 determines whether or not to update the information dial service menu when its power supply is turned on, when the user operates the terminal 4 for reading the menu, or when a preselected period of time elapses. If desired, the terminal 4 may make the above decision at two or three of such different timings. For example, the terminal 4 may make the decision when the power supply is turned on and again makes the same decision when the user reads the menu later. Further, the terminal 4 may make the decision at preselected intervals after the turn-on of the power supply and make the same decision when the user reads the menu.

The above three timings at which the mobile terminal 4 determines whether or not to update the information dial service menu are only illustrative. Alternatively, the terminal 4 may make the decision when the user performs a preselected operation to see if the menu has been updated or not, or calls a desired information dial service, or turns off the power supply, or touches any suitable part or a preselected part of the surface of the terminal 4. Further, the terminal 4 may make the decision at a preselected time. When the terminal 4 makes the above decision when the user calls a desired information dial service, a call is originated on the basis of the latest menu. That is, a call is not originated until the decision ends.

In the illustrative embodiments, as soon as the mobile terminal 1 updates its information dial service menu or when the user manipulates the operation 15, the terminal 1 displays the updated menu. At this instant, the updated part of the menu should preferably be distinguished from the other part by highlighting or by color. Specifically, the terminal 4 may compare, when the menu is updated, the menu stored in the RAM 19 and the latest menu on the basis of a preselected unit, e.g., item by item, and display the menu in such a manner as to provide distinction between the updated part and the other part.

While the above description has concentrated on a handy phone, the present invention is similarly applicable to any other radio communication apparatuses capable of providing information dial services and including personal handy-phone system (PHS) terminals, mobile data terminals having a communication function, and radio selective calling receiver. A radio selective calling receiver, however, cannot send updating history data to a communication apparatus. Therefore, a radio selective calling receiver is required to receive an information dial service menu sent from a communication apparatus 1 at preselected intervals and determine whether or not it is updated by itself.

In summary, in accordance with the present invention, a radio communication apparatus is capable of automatically updating an information dial service menu stored therein any time. This makes it needless for the user of the apparatus to update the menu by operating the apparatus and thereby enhances easy operation. Because the apparatus updates the menu any time, it prevents the user from dialing a wrong information dial service number.

Obviously, numerous additional modifications and variations of the present invention are possible in light of the above teachings. It is therefore to be understood that within the scope of the appended claims, the invention may be practiced otherwise than as specifically described herein.

What is claimed is:

1. A radio communication apparatus comprising:
   receiving means for receiving a radio signal;
   storing means for storing an information dial service menu;
   transmitting means for transmitting a request signal for inquiring whether or not the information dial service menu should be updated;
   deciding means for determining whether or not to update the information dial service menu on the basis of a signal received by said receiving means as an answer to said request signal;
   updating means for automatically updating the information dial service menu on the basis of a result of decision made by said deciding means; and
   sending means for sending updating history data, said deciding means making said decision on the basis of whether or not said receiving means receives a signal answering said updating history data within a preselected period of time.

2. An apparatus as claimed in claim 1, wherein the signal answering said updating history data includes a latest information dial service menu.

3. An apparatus as claimed in claim 2, wherein said updating means replaces the information dial service menu stored in said storing means with said latest information dial service menu.

4. An apparatus as claimed in claim 1, wherein said signal answering said updating history data includes only a content of the information dial service menu to be updated.

5. A radio communication apparatus comprising:
   receiving means for receiving a radio signal;
   storing means for storing an information dial service menu;
   transmitting means for transmitting a request signal for inquiring whether or not the information dial service menu should be updated;
   deciding means for determining whether or not to update the information dial service menu on the basis of a signal received by said receiving means as an answer to said request signal;
   updating means for automatically updating the information dial service menu on the basis of a result of decision made by said deciding means;
   counting means for counting time, said deciding means making the decision when said counting means counts a preselected period of time; and
   recognizing means for determining whether or not a communication is being held on said apparatus, said deciding means making, if said recognizing determines that a communication is being held when said counting means counts the preselected period of time, the decision when said communication ends.

6. A radio communication system comprising:
   a base station apparatus; and
   a radio communication apparatus;
   said radio communication apparatus comprising:
   storing means for storing an information dial service menu;
   sending means for sending updating history data to said base station apparatus at any suitable timing;
   deciding means for determining whether or not said radio communication apparatus has received a signal answering said updating history data within a preselected period of time; and
   updating means for updating the information dial service menu on the basis of a result of decision of said deciding means;
   said base station apparatus comprising:
   receiving means for receiving said updating history data sent from said radio communication apparatus;
   comparing means for comparing said updating history data and updating history data stored in said base station apparatus; and
   sending means for sending said signal to said radio communication apparatus.

7. A system as claimed in claim 6, wherein the any suitable timing is at least one of a time when a user of said radio communication apparatus turns on a power supply, a time when the user reads the information dial service menu, and a time when a preselected period of time elapses.

8. A method of controlling an updating of an information dial service menu stored in a radio communication apparatus, said method comprising the steps of:
   (a) storing the information dial service menu;
   (b) determining whether or not to update the information dial service menu;
   (c) automatically updating the information dial service menu on the basis of a result of decision made in step (b);
   (d) sending updating history information, step (b) comprising determining whether or not to update the information dial service menu on the basis of whether or not a signal answering aid updating history data is received with in a preselected period of time.

* * * * *